United States Patent [19]
Johann et al.

[11] Patent Number: 5,450,942
[45] Date of Patent: Sep. 19, 1995

[54] ACCUMULABLE CONVEYOR

[75] Inventors: Robu Johann, Olching; Enderlein Robby, Landsberg/Lech, all of Germany

[73] Assignee: Rsl Logistik GmbH & Co., Germany

[21] Appl. No.: 252,764

[22] Filed: Jun. 2, 1994

[51] Int. Cl.⁶ .................................................. B65G 37/00
[52] U.S. Cl. ................................ 198/465.4; 198/687.1; 104/172.4
[58] Field of Search ................. 198/465.4, 685, 687.1, 198/680, 678.1; 104/172.4, 249

[56] References Cited

U.S. PATENT DOCUMENTS

| | | | |
|---|---|---|---|
| 3,726,233 | 4/1973 | Swartz | 104/172.4 |
| 3,795,200 | 3/1974 | Pipes et al. | 104/172.4 |
| 4,073,238 | 2/1978 | Knudsen | 104/172.4 |
| 4,942,956 | 7/1990 | Acker et al. | 198/687 X |
| 5,038,900 | 8/1991 | Durant et al. | 198/465.4 |

FOREIGN PATENT DOCUMENTS

| | | | |
|---|---|---|---|
| 2661664 | 11/1991 | France | 198/465.4 |
| 1133313 | 7/1962 | Germany | 198/687 |
| 3612021 | 10/1987 | Germany . | |
| 106794 | 11/1992 | Germany . | |
| 1373759 | 11/1974 | United Kingdom . | |
| 237256 | 10/1989 | United Kingdom . | |
| 0304543 | 3/1989 | WIPO . | |
| 0338100 | 10/1989 | WIPO | 198/465.4 |

*Primary Examiner*—James R. Bidwell
*Attorney, Agent, or Firm*—Armstrong, Westerman, Hattori, McLeland & Naughton

[57] ABSTRACT

An accumulable conveyor, in particular a suspension conveyor (1), comprises an elongated drive member (13) in driving communication with a plurality of carrier members (4) horizontally spaced therefrom. An impact-pressure actuated separator is provided for temporarily disconnecting the drive connection and the carrier members during accumulation of the carrier members. The separator comprises a spreader (16) for increasing the horizontal distance between the carrier members (4) and the drive member (13) for disconnecting the drive connection.

13 Claims, 4 Drawing Sheets

ACCUMULABLE CONVEYOR

BACKGROUND OF THE INVENTION

1. Field of the Invention

The present invention relates to an accumulable conveyor, in particular to a suspension conveyor including an elongated drive member in communication with a conveyor means for temporarily disconnecting the drive connection in the accumulation area.

2. Prior Art

Conveyors of this type are largely known, e.g., from U.S. Pat. No. Specification 3,795,200. The known conveyor includes a drive chain as a drive member which has a pusher dog pivotably secured thereto. The pusher dog grips with a pusher surface in form-locking fashion behind a conveyor means, so that the conveyor means is carried along during movement of the elongated drive member. Furthermore, the dog includes an abutment surface which can engage an abutment surface on the conveyor means in such a manner that the dog is lifted from its pusher position when such an engagement takes place. Pusher surfaces and abutment surfaces are arranged on the conveyor means and dogs in such a manner that the abutment surface of a dog engages the abutment surface of a conveyor means which is the immediately preceding one in the conveying direction, as soon as a specific distance between the preceding conveyor means and the conveyor means carried along by the dog is not reached, which is for instance the case during accumulation. The dog is lifted by the impact pressure, releases the conveyor means which has so far been towed thereby, and inefficiently moves away forwardly together with the drive over the accumulated conveyor means. Hence, with this type of conveyor it is only the pusher means that moves whilst both the drive member and the conveyor means remain in their former alignment and at their former distance. This kind of an impact-pressure actuated separation means for separating the conveyor means from the drive requires, however, a specifically designed drive and has to be changed when the drive is, for instance, changed.

SUMMARY OF THE INVENTION

It is therefore the object of the present invention to provide an accumulable conveyor with a universally usable separation means.

This object is attained by use of a separation means including a spreader device for increasing the distance between the conveyor means and the drive member for disconnecting the drive connection.

With the aid of the spreader means used according to the invention, the conveyor means can be separated from the drive, irrespective of the fact which specific kind of drive has been used.

During separation the conveyor means is expediently pivoted away from the drive by providing conveyor means swinglingly hung via rollers onto a rail in a direction transverse to the conveying direction and adapted to be pivoted away by the spreader device in a direction transverse to the conveying direction from the drive member extending laterally next to the conveyor means.

The invention is used in a specifically expedient manner in an accumulable conveyor equipped with a friction belt drive. As a rule, friction belt conveyors as such are already accumulable because the friction belt can move along the friction surfaces of the conveyor means when the conveyor means are stopped within an accumulation. However, since there is a relatively great friction between the friction surfaces and the friction belt, which friction must be sufficient for carrying along also loaded conveyor means, friction belt and friction surfaces are subjected to considerable wear during accumulation. Moreover, the drive of the friction belt must apply a constantly increasing drive force with an increasing number of accumulated conveyor means to overcome the friction forces. Both disadvantages are predominantly avoided with the spreader device according to the invention.

BRIEF DESCRIPTION OF THE DRAWINGS

An embodiment of the invention shall now be explained in more detail with reference to the drawings, in which.

DESCRIPTION OF PREFERRED EMBODIMENTS

Figure 1:
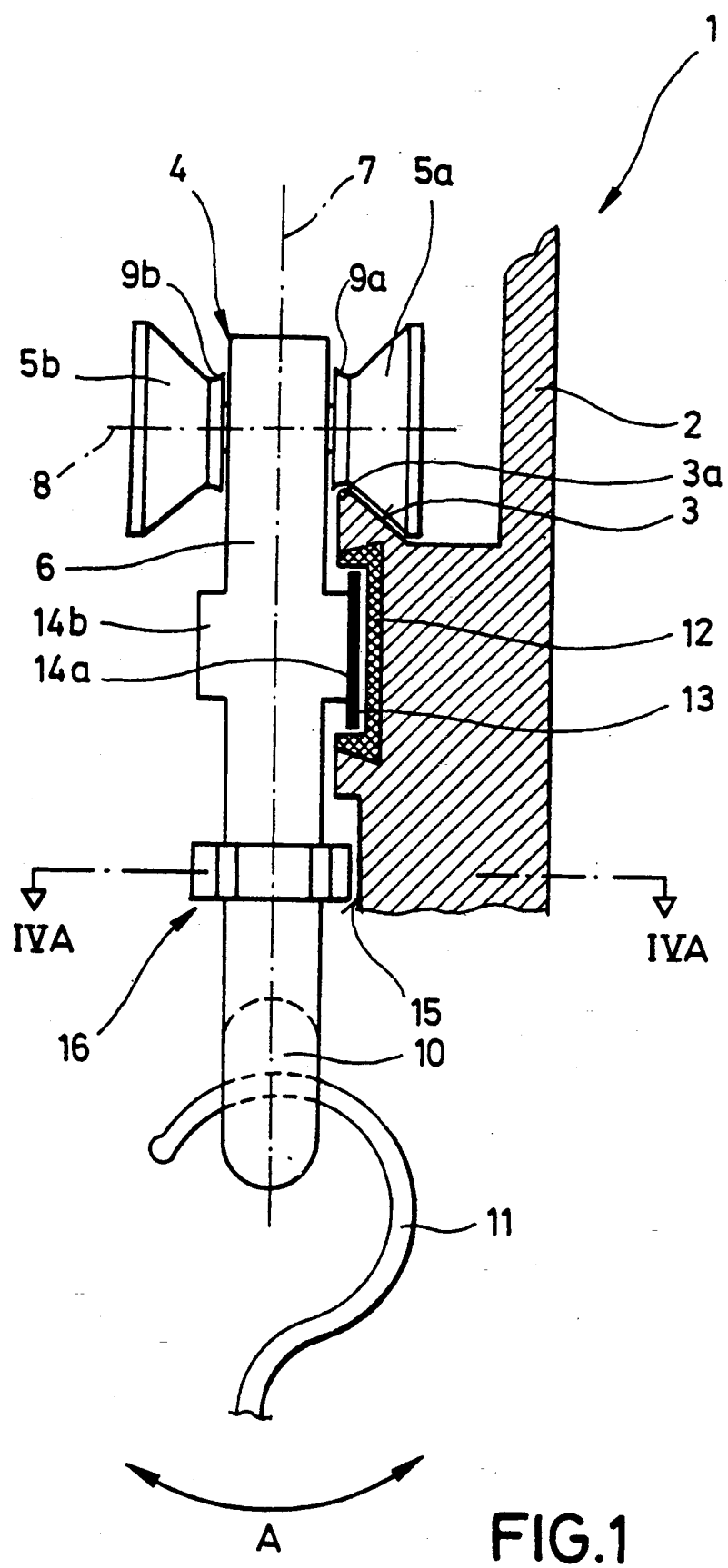
FIG. 1 is a sectional view through a conveyor of the invention in the conveying mode.

FIG. 1 illustrates an accumulable suspension conveyor 1 which comprises a rail 2 drawn in section, which extends in a direction perpendicular to the plane of drawing. Rail 2 has a running surface 3 which extends at an angle of 45° in the illustrated embodiment. A conveyor means or carrier member 4 is hung onto running surface 3 with one of its rollers 5a. Conveyor means 4 includes a vertical carrier 6 from which rollers 5a and 5b project at both sides and in symmetry with the center line 7 of carrier 6. Rollers 5a and 5b are rotatable about a horizontal axis of rotation 8 and have a conically extending surface line, with the narrow side facing carrier 6. At the narrow side each of rollers 5a, 5b is provided with a groove 9a and 9b, tip 3a is rounded, so that conveyor means 4 can swing by a certain amount in the direction of arrow A transversely to conveying direction B which is perpendicular to the plane of drawing.

At the end of the vertical carrier 6 which faces away from rollers 5a, 5b, carrier 6 is provided with a hook 10 into which a cloth hanger 11 can, for instance, be hung with the clothes to be transported. It is also possible to connect two of the carriers 6 by means of a connection rod that has been provided instead of hook 10 to obtain a conveyor carriage.

A guide 12 in which a friction belt 13 of a friction belt drive is accommodated is provided below track 3 in rail 2. At the side facing friction belt 13, conveyor means 4 has a conveyor projection 14a which projects from carrier 6 and rests on friction belt 13 when conveyor means 4 is hung onto track 3 by the action of its own weight, with conveyor projection 14a being pressed into even closer contact with friction belt 13 by the weight of the cloth hanging on cloth hanger 11. Another conveyor projection 14b which may equally come into engagement with friction belt 13 when conveyor means 4 is turned by 180° and is hung with its roller 5b onto track 3 is provided on carrier 6 at the side of center line 7 which is opposite to conveyor projection 14a.

A contact surface 15 which extends in parallel with and at a distance from friction belt 13 of the drive is arranged below guide 12 on rail 2. A separation means in the form of a spreader device 16 is provided on carrier 6 at the level of contact surface 15, spreader device 16 being shown in more detail in FIG. 2.

Figure 2:
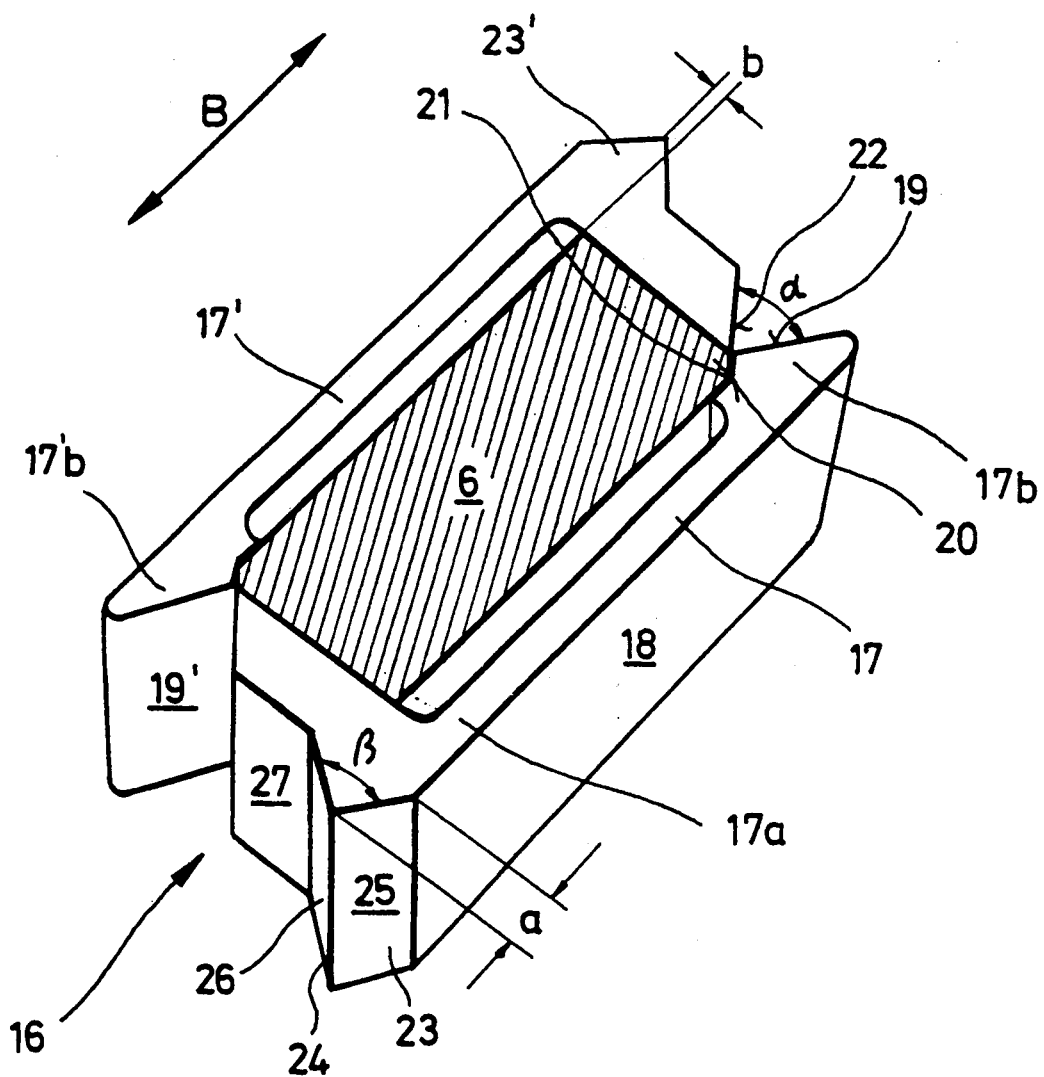
FIG. 2 is a perspective enlarged view of the spreader device.

As shown in FIG. 2, spreader device 16 consists of a plastic member which is secured to carrier 6. At the side opposite to contact surface 15, spreader device 16 includes a resilient web 17 which is fixed with its rear part 17a on carrier 6 and whose other end facing forwardly in the direction of the conveying movement comprises a bracket 17b. Surface 18 of web 17 which faces contact surface 15 is smooth and extends in parallel with and at a small distance from contact surface 15 when conveyor means 4 is hung in the conveying position shown in FIG. 1. Bracket 17b has an abutment surface 19 which extends from the plane outer surface 18 obliquely inwardly towards center line 7 of carrier 6. At the inwardly facing tip of bracket 17b, abutment surface 19 terminates in a recess 20 which cooperates with a corresponding projection 21 on carrier 6. Another abutment surface 22 extends from projection 21 at an angle relative to abutment surface 19 obliquely outwards, so that in the relaxed state of spring web 17 the two abutment surfaces 19 and 22 define a recess of triangular cross-section and an opening angle $\beta$ which is slightly smaller than 90°.

A spreader projection 23 formed in the manner of a blade is provided at the end of spreader device 16 that is opposite to bracket 17b. Spreader projection 23 is formed by two counter-surfaces 25 and 26 which converge in an edge 24 and enclose an angle $\beta$ which is greater than angle $\beta$ and preferably 90°.

Next to spreader projection 23, a boundary surface 27 extends in a direction transverse to conveying direction B. Spreader projection 23 projects beyond said boundary surface 27 by an amount a which is greater than the depth of the recess formed by abutment surfaces 19 and 22. When viewed in a direction transverse to conveying direction B, edge 24 of the spreader projection 23 is farther away from the center line 7 of carrier 6 by an amount b than the tip of the recess formed in the relaxed state of spring web 17 between abutment surfaces 19 and 22.

At the side of carrier 6 which is opposite to friction belt 13 in FIG. 1, spreader device 16 also includes a spring web 17' and a spreader projection 23' which are identical with spring web 17 and spreader projection 23, but arranged in mirror-inverted fashion. The corresponding members are therefore designated by the same reference numerals supplemented by a prime and will not be explained again.

Figure 4B:
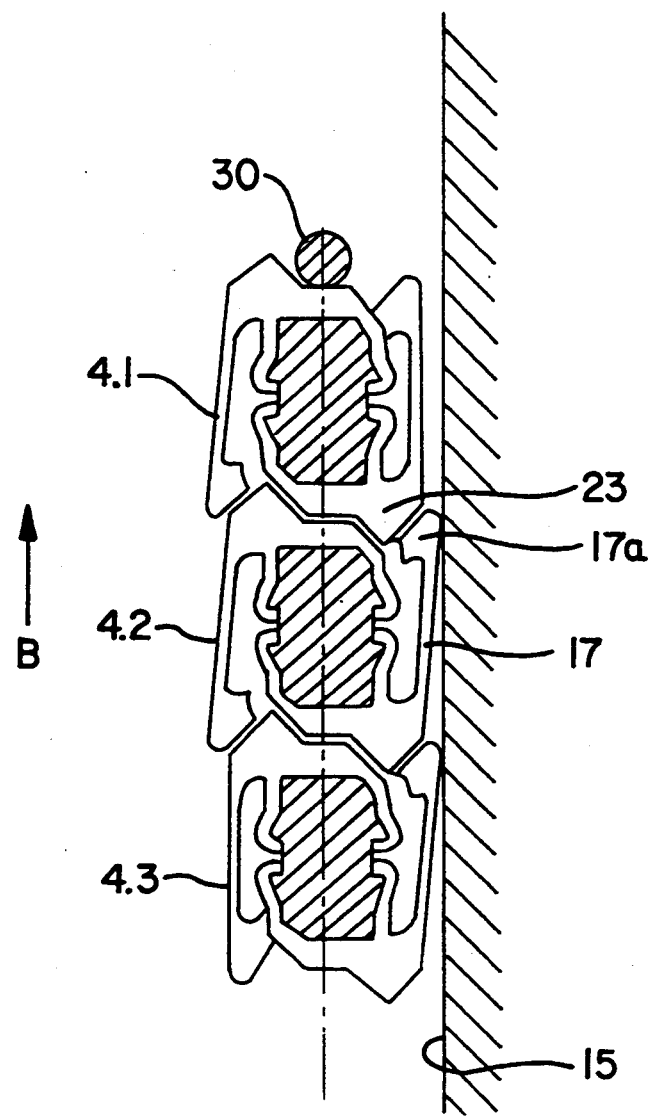
FIG. 4 is a sectional view of a conveyor at the level of the spreader device with FIG. 4A showing section IVA—IVA of FIG. 1 and FIG. 4B section IVB—IVB of FIG. 3.
Figure 4A:
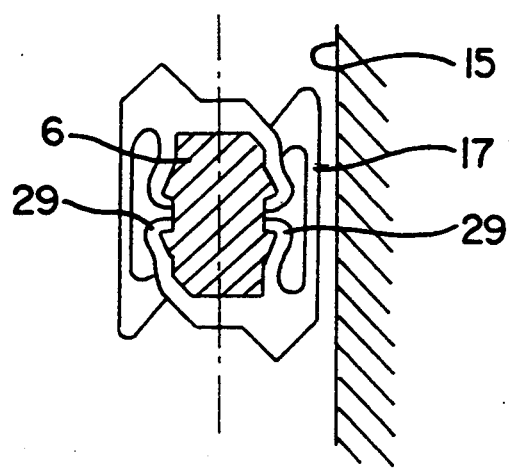

In the embodiment of FIG. 2, the spreader device 16 consists of plastics and was integrally produced with carrier 6, which is also made from plastics. As shown in FIG. 4, the members of the spreader device 16 may also be composed of individually manufactured components and may be secured to carrier 6. In the embodiment of FIG. 4, a spring web 17, the adjacent spreader projection 23 and the adjacent boundary surface 27 are each molded on a component 28 which is secured with fastening webs to carrier 6. This configuration has the advantage that a component 28 shaped in the same way, which need only be turned when being mounted on the carrier can be used for the spreader device 16 at both sides of the carrier.

Figure 3:
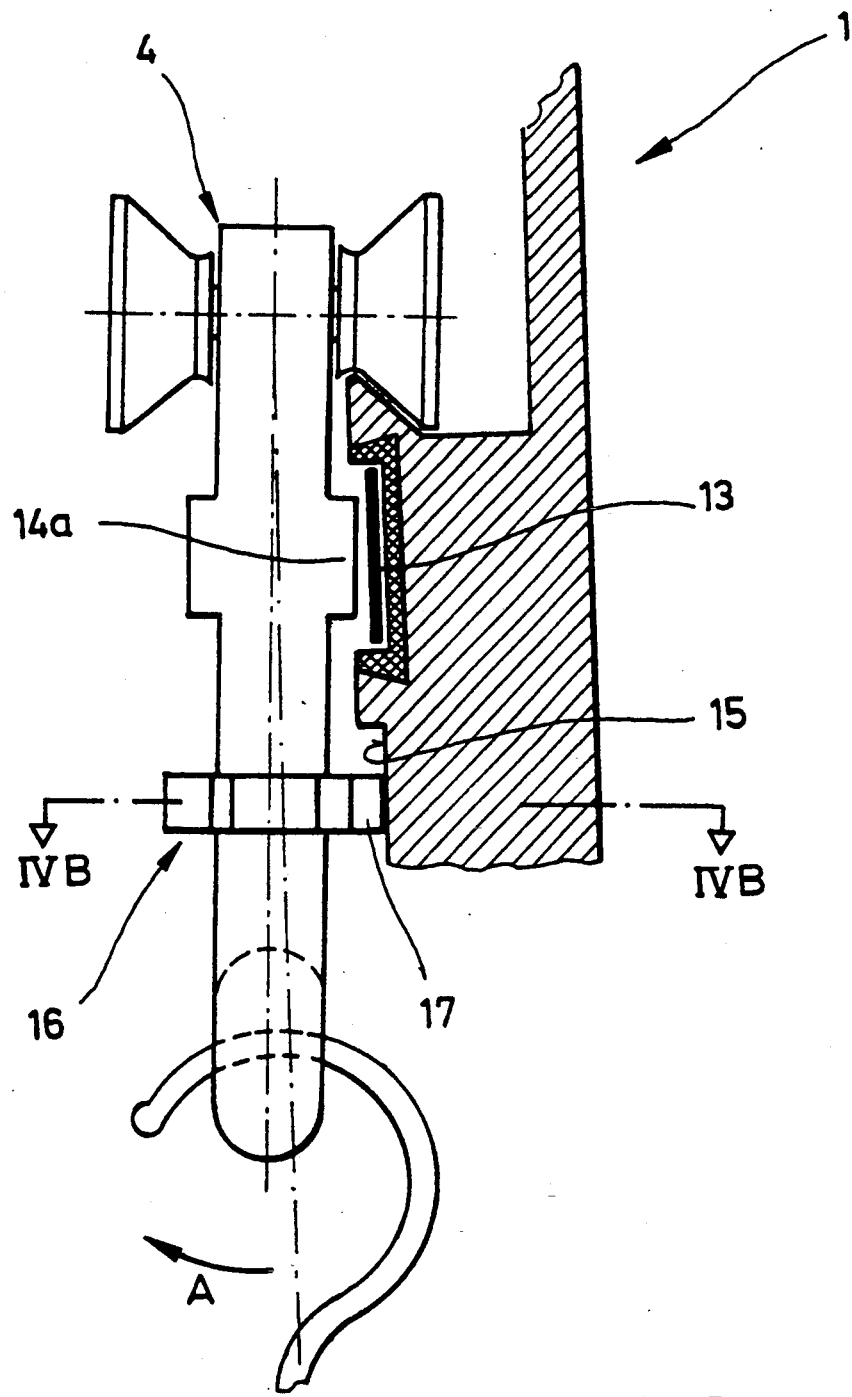
FIG. 3 is a sectional view of a conveyor according to Claim 1 in the accumulated mode.

The operation of the suspension conveyor during accumulation shall now be explained in the following with reference to FIGS. 3 and 4. During normal operation conveyor means 4, as shown in FIG. 1, are carried along through contact of one of their conveyor projections 14a or 14b with friction belt 13 during movement of friction belt 13. Center line 7 extends substantially in vertical direction through carrier 6. Spring web 17 is in parallel with and at a distance from contact surface 15. When said conveyor means 4 hits against an obstacle, as is, for instance, outlined in FIG. 4B by way of a holding finger 30, conveyor means 4.1 advancing in conveying direction B stops while friction belt 13 drags past conveyor projection 14a. However, when the immediately following conveyor means 4.2 impinges on the stopped conveyor means 4.1, the abutment surfaces 19 and 22 of the successive conveyor means 4.2 hit against the counter-surfaces 25 and 26 of the leading conveyor means 4.1 and press against spreader projection 23 due to the impact pressure. As a consequence of distance b between edge 24 of spreader projection 23 and the tip of the recess 20 formed by abutment surfaces 19 and 22, conveyor means 4.1 which is the leading one in the conveying direction is pivoted in the direction of arrow A into the inclined position shown in FIG. 3, in which conveyor projection 14a is released from friction belt 13.

When a third conveyor means 4.3 impinges on the already accumulated conveyor means 4.1 and 4.2, the second conveyor means 4.2 is first lifted from friction belt 13 due to the difference in distance b. Moreover, the second conveyor means 4.2 is pushed by the impact pressure even further onto the first conveyor means 4.1, so that the spreader projection 23 is immersed, due to its greater length a, even further between abutment surfaces 19 and 22 of the second conveyor means 4.2 and spreads spring web 17 to such an extent that the latter is supported on contact surface 15. As a result, the trailing conveyor means 4.3 is freed from the torque load caused by the swinging movement. The effects described with reference to the trailing conveyor means 4.2 and 4.3 can be observed with every conveyor means 4 still impinging on the accumulation at any length of the accumulation area. Hence, the drive of friction belt 13 has only to overcome the friction forces arising between the conveyor means that is the last one in the accumulation direction or, with a long accumulation, between the last conveyor means and the friction belt, which relieves the drive to a very considerable extent and reduces wear.

If the obstacle in the form of the holding finger 30 is removed, the spring power of the spread spring web 17 of the second conveyor means 4.1 pushes spreader projection 23 of the first conveyor means 4.1 forwardly from the recess formed by abutment surfaces 19 and 22, so that the first conveyor means 4.1 can pivot back again until its conveyor projection 14a comes to rest on friction belt 13 and the first conveyor means 4.1 is transported away. The accumulation is dissolved in an identical manner in the subsequent conveyor means.

In a modification of the illustrated embodiment, the spreader device of the invention may also be provided in conveyors which are designed for a form-locking drive (with the aid of dogs that are not too large). In this case the conveyor means which is the rearmost one within the accumulation is pressed by the dog against the front conveyor means to such an extent that spring web 17 thereof is spread and the rearmost conveyor means swings also outwards, whereby it is released from the dog. The rearmost conveyor means will then immediately fall back and be pressed again by the next dog against the accumulation, whereupon spring web 17 is again spread and conveyor means is again lifted, etc. Instead of spring web 17, there may be provided another spring element that can be brought into and out of contact with the contact surface by an actuating means of its own. The contact surface need not necessarily be provided over the whole length of the friction belt drive, but may only be located at places where an accumulation, for instance during isolation, is constructionally given or has to be expected as a rule.

What is claimed is:

1. An accumulable suspension-type conveyor (1) comprising an elongated track (2), an elongated drive member (13) extending essentially parallel to the track (2), at least two carrier members (4) swingingly hung by rollers (5a, 5b) from the track (2) in a direction transverse to a conveying direction and, in a drive position, extending in a substantially vertical position with respect to the track (2) and in a substantially horizontal position with respect to the drive member (13), at least one projection (14) on each carrier member (4) extending horizontally therefrom and engageable with the drive member (13) in a drive position of the conveyor (1), and an impact pressure-actuated separation means for temporarily disengaging a carrier member (4) from the drive member (13) in a carrier member accumulation area, wherein said separation means includes a spreader device (16) for increasing the horizontal distance between a projection (14) and the drive member (13) whereby the carrier member (4) is disengaged from contact with the drive member (13).

2. A conveyor according to claim 1, wherein said carrier members (4) are adapted to be pivoted away by said spreader device (16) in a direction transverse to a conveying direction (B) from said drive member (13).

3. A conveyor according to one of claims 1 and 2, wherein said drive member is a friction belt (13).

4. A conveyor according to one of claims 1 and 2, wherein said spreader device (16) has at least one notch-shaped abutment surface (19, 22) and at least one complementarily-shaped projecting counter-surface (25, 26) which surfaces are arranged on carrier members (4) successively in conveying direction (B), extend in a direction oblique to conveying direction (B), and abut on each other in the accumulation area such that, when the counter-surface (25, 26) of a leading carrier member (4.1) abuts the abutment surface (19, 22) of a trailing carrier member 4.2, the leading carrier member 4.1 is separated from said drive member (13).

5. A conveyor according to claim 2, wherein said spreader device (16) comprises a spring element (17) which is disposed between a contact surface (15) arranged outside said drive member (13) and in parallel therewith and said carrier member 4.

6. A conveyor according to claim 5, wherein said spring element (17) is movable into contact with said contact surface (15) by an actuating means comprising counter-surfaces (25, 26) arranged on an immediately neighboring carrier member (4).

7. A conveyor according to claim 1, wherein a spreader means (16) is provided at each side of said conveyor means (4).

8. An accumulable suspension-type conveyor (1) comprising an elongated track (2), an elongated drive member (13) extending essentially parallel to the track (2), at least two carrier members (4) swingingly hung by rollers (5a, 5b) from the track (2) in a direction transverse to a conveying direction (B) and, in a drive position, extending in a substantially vertical position with respect to the track (2), at least one projection (14) on each carrier member (4) extending horizontally therefrom and engageable with the drive member (13) in a drive position of the conveyor (1), and an impact pressure-actuated separation means for temporarily disengaging a carrier member (4) from the drive member (13) in a carrier member accumulation area, wherein said separation means includes a spreader device (16) for increasing the horizontal distance between a projection (14) and the drive member (13) whereby a corresponding carrier member (4) is disengaged from contact with the drive member (13), wherein each of said carrier members is adapted to be pivoted away from said drive member (13) by said spreader device (16) in a direction transverse to conveying direction (B), wherein said spreader device (16) comprises a spring element disposed between a contact surface (15) arranged outside said drive member (13) in parallel therewith and said carrier member (4) and is movable into contact with said contact surface (15) by an actuating means arranged on an immediately neighboring carrier member (4), and wherein said spring element is a spring web (17) which is secured with one of its ends (17a) to said carrier member (4) and the other end (17b) of which is provided with an abutment surface (19), said actuating means comprising a spreader projection (23) provided with a counter-surface (25, 26) which can be brought into engagement with said abutment surface (19) of another carrier member (4) which is directly adjacent in conveying direction (B), said carrier member (4) being pivoted by the co-action of said spreader projection (23) and said abutment surface (19) for disconnecting said drive member (13), and said spring web (17) being pressed into contact with said contact surface (15).

9. A conveyor according to claim 8, wherein there are provided two abutment surfaces (19, 22) which are arranged at an angle ($\alpha$) and form a recess, as well as two counter-surfaces (25, 26) which are arranged relative to one another at an angle ($\beta$) and form a spreader projection (23) shaped like a blade, said recess formed by said abutment surfaces (19, 22) being closer to a center line (7) of said conveyor means (4) by an amount (b) than an edge (24) shaped like a blade and formed by said counter-surfaces (25, 26) of said spreader projection (23).

10. A conveyor according to claim 9, wherein the height of said spreader projection (23) in a conveying direction (B) is greater than the depth of the recess formed by said abutment surfaces (19, 22) in conveying direction (B).

11. A conveyor according to claim 9 or 10, wherein said angle ($\alpha$) between said abutment surfaces (19, 22) is smaller in the relaxed state of spring web (17) than said angle ($\beta$) between said counter-surfaces (25, 26) of said spreader projection (23).

12. A conveyor according to claim 11, wherein said spring web (17) and said spreader projection (239) are each molded onto a plastic member (29) to be secured to said conveyor means (4).

13. A conveyor according to claim 12, wherein a spreader means (16) is provided at each side of said conveyor means (4).

* * * * *